United States Patent
Chien et al.

(10) Patent No.: US 6,852,376 B2
(45) Date of Patent: Feb. 8, 2005

(54) ANTIGLARE FILM

(75) Inventors: Jung-Chen Chien, Taoyuan (TW); Ta-Wang Lai, Taoyuan (TW); Bor-Ping Wang, Taoyuan (TW); Hung-Chi Chen, Taoyuan (TW)

(73) Assignee: Optimax Technology Corporation, Taoyuan (TW)

( * ) Notice: Subject to any disclaimer, the term of this patent is extended or adjusted under 35 U.S.C. 154(b) by 121 days.

(21) Appl. No.: 10/403,092

(22) Filed: Apr. 1, 2003

(65) Prior Publication Data

US 2004/0071937 A1 Apr. 15, 2004

(30) Foreign Application Priority Data

Oct. 15, 2002 (TW) .......................................... 91123748

(51) Int. Cl.$^7$ .............................. B32B 1/00; B32B 3/00; B32B 33/00
(52) U.S. Cl. ........................ 428/1.3; 428/332; 428/143; 428/145; 428/323; 427/163.4; 427/167; 349/112; 359/613; 359/615
(58) Field of Search ........................ 428/1.3, 323, 325, 428/331–332; 427/163.4, 167; 349/112, 137; 359/599, 601, 613–615

(56) References Cited

U.S. PATENT DOCUMENTS

| | | | | |
|---|---|---|---|---|
| 5,909,314 A | * | 6/1999 | Oka et al. .................... | 359/582 |
| 5,995,288 A | * | 11/1999 | Kashima et al. ............. | 359/599 |
| 5,998,013 A | * | 12/1999 | Shoshi et al. ................ | 428/331 |
| 6,064,524 A | * | 5/2000 | Oka et al. .................... | 359/582 |
| 6,074,741 A | * | 6/2000 | Murata et al. ............... | 428/327 |
| 6,164,785 A | * | 12/2000 | Maekawa .................... | 359/613 |
| 6,217,176 B1 | | 4/2001 | Maekawa .................... | 359/601 |
| 6,268,961 B1 | * | 7/2001 | Nevitt et al. ................. | 359/488 |
| 6,347,871 B2 | * | 2/2002 | Matsunaga et al. .......... | 359/613 |
| 6,660,389 B2 | * | 12/2003 | Liu et al. ..................... | 428/421 |

* cited by examiner

*Primary Examiner*—Harold Pyon
*Assistant Examiner*—Sow-Fun Hon
(74) *Attorney, Agent, or Firm*—Birch, Stewart, Kolasch & Birch, LLP

(57) ABSTRACT

An antiglare film applicable to polarizers or displays includes a light-transparent resin, first light-transparent particles dispersed on surface of the light-transparent resin and second light-transparent particles dispersed inside the resin. The first light-transparent particles have a same refractive index as that of the resin and particle diameters of 9 to 500 nanometers that provide a less roughness surface of the resin in order to prevent from large angle diffusion to the interior light and improve clarity of image. The second particles have a different refractive index from the resin so as to diffuse the exterior light that comes to the antiglare film so as to decrease glare. The antiglare film can be made by one time of coating. The two layer light-transparent particles provide light interference and achieve a low reflectivity.

15 Claims, 3 Drawing Sheets

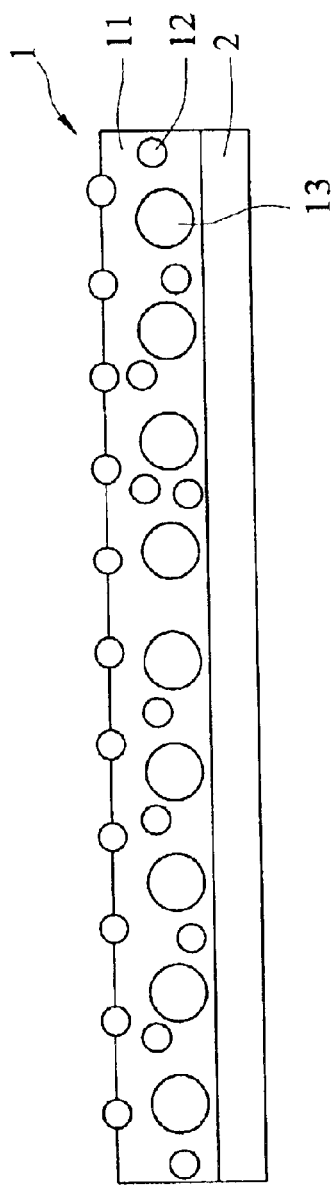
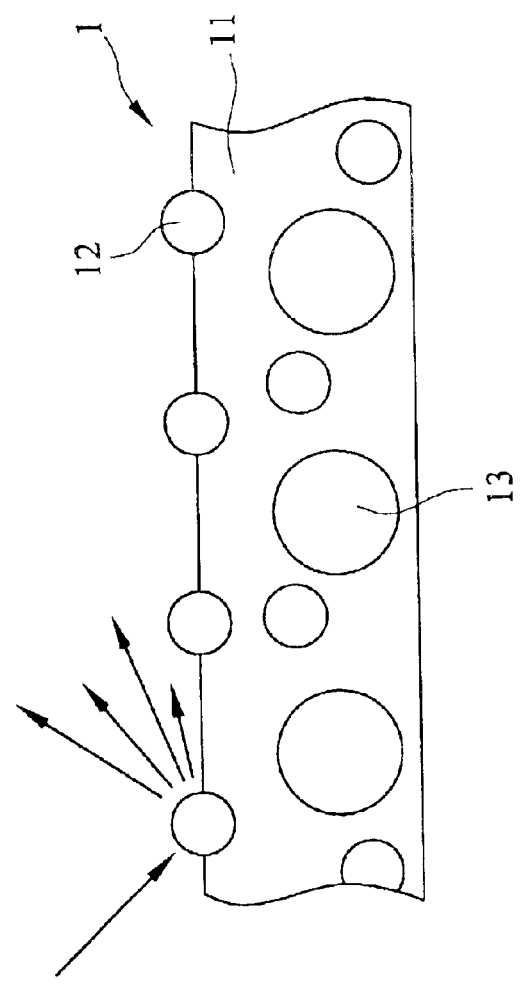

ANTIGLARE FILM

BACKGROUND OF THE INVENTION

1. Field of the Invention

The invention generally relates to an antiglare film applicable to polarizers or screens of computers, TVs or the like, and particularly relates to a high resolution and low reflectivity antiglare film that enables a clear display.

2. Related Art

In a display with light emission, the light emitting from interior of the display has to be diffused before leaving the display surface, otherwise the light is glaring and irritant to user's eyes. Therefore, there is usually an antiglare film furnished on surface of a display for diffusing the emitting light. On the other hand, any exterior light coming to the surface of the display should also be diffused in order to prevent from reflection and causing difficulty for user to watch images on the display. So, an antiglare film for the display is desired to be functional both in diffusing the interior light and reducing reflection of the exterior light.

There are a lot of technical documents and patents relating to antiglare film. Some documents and patents on antiglare films using light-transparent fine particle coatings are described herein.

U.S. Pat. No. 5,998,013 discloses an antiglare hard coat film for diffusing exterior light. The film is coated with a layer comprising an ultraviolet-curing resin and agglomerates of colloidal silica particles formed with an amine compound. The colloidal silica particles are used to form the roughness of the surface, however, the particles with variant diameters unevenly gathered on the film surface cause insufficient visibility of the film. Especially when making a higher diffusion antiglare film with higher roughness, the clarity gets worse. Similarly, antiglare films disclosed in U.S. Pat. Nos. 6,074,741 and 6,164,785 also have the problems of less clarity for higher diffusion. Further, the prior arts do not achieve a low reflectivity property.

In order to increase diffusion rate, the prior arts use larger particles to get higher roughness. However, the higher diffusion also lowers the clarity and contrast of the image. Therefore, methods for controlling particle size or mixing different kinds of particles evenly to solve the aforesaid problems become important development issues.

Besides using the aforesaid light-transparent particles coated on a film for diffusing the exterior light, another kind of antiglare film uses particles dispersed in a resin, and diffuses the interior light by means of the different refractive indexes between the particle and the resin. For example, in U.S. Pat. No. 6,217,176, two kinds of light-transparent particles with different refractive index are contained in a light-transparent resin. So, the interior light can be diffused by the particles. The particles stacked on the film also diffuse the exterior light and improve image clarity. However, this antiglare film still lacks of a low reflectivity. Then, in U.S. Pat. No. 6,347,871, two resin coat layers having properties of diffusing interior and exterior light respectively are coated on the film. The process is more complicated due to the two layer coatings, and the antiglare film still lacks of a low reflectivity.

For the above reasons, it is required to have an antiglare film capable of diffusing interior and exterior lights for preventing glare, improving visibility, and also decreasing reflectivity of the display. Nano-grade particles are well dispersed on surface of a resin. The roughness and dispersal of particles can be controlled so as to prevent from the problems of larger particles, uneven dispersal, low clarity and low contrast of prior arts. A one-time coating and a low reflectivity are also attained.

SUMMARY OF THE INVENTION

The primary object of the invention is to provide an antiglare film capable of diffusing interior and exterior lights for preventing glare and improving visibility.

Another object of the invention is to provide an antiglare film having a low reflectivity and requiring only one time of coating.

An antiglare film according to the invention is applicable to polarizers or screens of computers, TVs or the like. The antiglare film furnished on a film substrate includes a light-transparent resin, first light-transparent particles and second light-transparent particles. The first and second particles diffuse both interior and exterior lights that come to the antiglare film so as to prevent from glare and improve visibility.

Before coating the antiglare material on the film substrate, the light-transparent resin, first light-transparent particles and second light-transparent particles are well stirred and mixed so that the first and second particles are well dispersed in the resin to lessen the surface roughness and keep the particle mixture uniform.

The first light-transparent particles are dispersed in surface and interior of the light-transparent resin. The refractive index of the first particles is same as that of the resin. The first particles are of nano-grade that can be easily dispersed and controlled. The second light-transparent particles are dispersed in interior of the light-transparent resin and having a different refractive index from the resin. The sizes of the second particles are larger than the sizes of the first particles so as to be naturally dispersed by their weight in the interior of the resin, and push the first particles up to the surface of the resin.

Therefore, when an exterior light comes to the antiglare film, the rough surface caused by dispersion of the first particles in the resin diffuses the exterior light. Since the first particles are of nano-grade, the surface roughness is small that diffuses the exterior light with small diffusion angles and increases the image clarity. On the other hand, the interior light passing through the substrate to the antiglare film is diffused by the second light-transparent particles because they are inside the resin and have a different refractive index from that of the resin. As a result, the antiglare film of the invention increases the visibility, simplifies the process by one-time coating, and decreases the reflectivity by optical interference effects of the two light-transparent particles.

BRIEF DESCRIPTION OF THE DRAWINGS

The invention will become more fully understood from the detailed description given hereinbelow. However, this description is for purposes of illustration only, and thus is not limitative of the invention, wherein:

FIG. 1 is a sectional view of an antiglare film of the invention coated on a substrate;

FIG. 2 is a descriptive view of exterior light diffusion in an antiglare film of the invention;

DETAILED DESCRIPTION OF THE INVENTION

Figure 3:
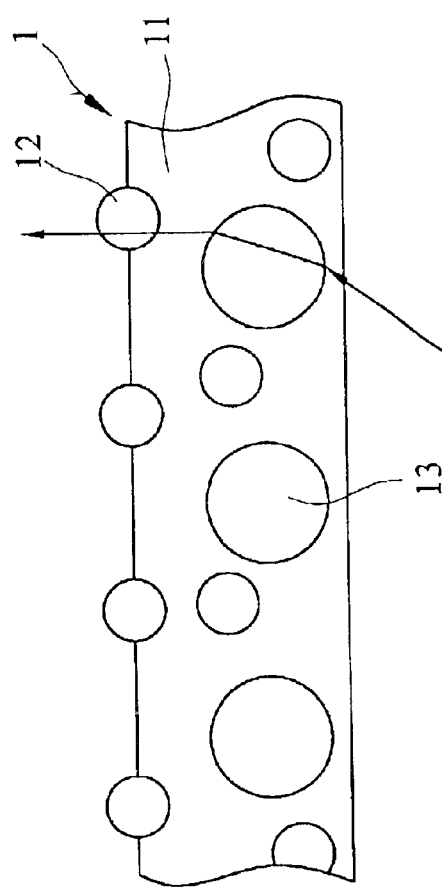
FIG. 3 is a descriptive view of interior light diffusion in an antiglare film of the invention.

As shown in FIG. 1, an antiglare film according to the invention is applicable to polarizers or screens of computers, TVs or the like. The antiglare film 1 includes a light-transparent resin 11, first light-transparent particles 12 and second light-transparent particles 13. So, the interior light passing through the substrate 2 and the exterior light irradiating on the substrate 2 are diffused to avoid glare to user's eyes, to increase visibility of the displayed image and to decrease the reflectivity of the screen.

The light-transparent resin 11 is a kind of curable resin, such as ultraviolet-curing resin, having high transparency. The resin 11 is well mixed with the first light-transparent particles 12 and the second light-transparent particles 13, and then painted on surface of the substrate 2, which is the screen of a display, for example. The resin mixture is then cured and fixed on the substrate 2 where the first and second light-transparent particles are evenly dispersed and fixed in position to achieve a less surface roughness of the antiglare film 1.

The first light-transparent particles 12 are dispersed on surface and in the interior of the resin 11. The refractive index of the first light-transparent particles is same as that of the resin 11. The diameters of the first light-transparent particles 12 are of nano-grade, such as 9 to 500 nanometers, so as to be easily dispersed and make a uniform coating surface.

The second light-transparent particles 13 are dispersed in the interior of the resin 11. The refractive index of the second particles 12 dispersed on surface of the resin 11 diffuses the exterior light. Because the first light-transparent particles 12 are of nano-grade, the roughness of the resin surface is less so that the display image provided by interior light is diffused with smaller angles and remained clear. As shown in FIG. 3, when interior light passing through the substrate 2 to the antiglare film 1, since the second light-transparent particles 13 having a refractive index different from that of the resin 11 are dispersed inside the resin 11, the interior light is diffused. As for the first light-transparent particles 12 dispersed in the resin 11, since they have a same refractive index as the resin, they do not diffuse the passing light.

The following description and TABLE 1 are test data of three embodiments of the invention and comparative samples of other antiglare films. The testing devices for the comparison are listed below.

1) Haze and Light transmittance

The haze and light transmittance were measured in accordance with JIS K 7105 using a haze meter produced by Nippon Electric Industry Co., Ltd.

2) 60-degree Gloss

The antiglare property was measured though 60-degree gloss tests. The 60 degree gloss was measured in accordance with the method of JIS Z 8741 using a gross meter produced by Nippon Electric Industry Co., Ltd.

3) Clarity of Vision Through

The clarity of vision through was measured in accordance with the method of Japanese Industrial Standard K7105 using an apparatus for measurement of image formation produced by Suga Test Instruments Co., Ltd.

4) 5-degree reflection

The 5-degree reflection was measured by a digital varied-angle optometer produced by Hitachi, Ltd.

TABLE 1

|  | First particles | | Second particles | | | | | |
|---|---|---|---|---|---|---|---|---|
|  | Weight ratio | Diameter (nanometer) | Weight ratio | Diameter (micrometer) | Haze | Antiglare property | Clarity | Reflectivity |
| Embodiment 1 | 10 | 13 | 4 | 3.5 | 44 | ρ | 160 | 1.5 |
| Embodiment 2 | 20 | 13 | 2 | 3.5 | 45 | ο | 180 | 0.9 |
| Embodiment 3 | 10 | 25 | 4 | 3.5 | 42 | ο | 220 | 1.1 |
| Comparative 1 | 4 | 1500 | — | — | 20 | ρ | 80 | 2.5 |
| Comparative 2 | — | — | 4 | 3.5 | 40 | ρ | 150 | 2.1 |

ρ Bad antiglare property

ο Good antiglare property light-transparent particles is different from that of the resin 11. The diameters of the second light-transparent particles 13 are larger than that of the first light-transparent particles 12, such as 1 to 10 micrometers, and preferably 1 to 5 micrometers, and the refractive index is 1.50 to 1.65, so as to be dispersed inside the resin 11 by their own weight and push the first light-transparent particles 12 up to the surface of the resin 11.

As shown in FIG. 2, when exterior light irradiates on the antiglare film 1, the roughness of the first light-transparent Embodiment 1

Each with 20 parts by weight of two ultraviolet-curing resins CN983B88 of Sartomer Co. and KRM7039 of Daicel Co. that have a same refractive index of 1.45; 2 parts by weight of photo-cationic polymerization initiator (a product of Ciba Co., Irgacure 184); 10 parts by weight of nano-grade silica particles as the First particles (a product of Clariant Co., OG502-31, having refractive index 1.45 and average particle diameter 13 nanometers); and 4 parts by weight of polystyrene beads as the second particles (a product of Soken Co., having average diameter 3.5 micrometers and refractive index 1.57) were added. To the obtained mixture, 50 parts by weight of isopropyl alcohol was added and mixed well to prepare a hard coat material. Then, a film of triacetate (a product of Fuji Co, T-80UZ) was coated with the above hard coat material in a wet film thickness of 20 micrometers, and the obtained product was dried at 70° C. for 3 minute. The dried layer was irradiated with ultraviolet light using an ultraviolet light irradiation apparatus to prepare a hard coat film by curing.

Embodiment 2

Each with 20 parts by weight of two ultraviolet-curing resins CN983B88 of Sartomer Co. and KRM7039 of Daicel Co. that have a same refractive index of 1.45; 2 parts by weight of photo-cationic polymerization initiator (a product of Ciba Co., Irgacure 184); 10 parts by weight of nano-grade silica particles as the first particles (a product of Clariant Co., OG502-31, having refractive index 1.45 and average particle diameter 13 nanometers); and 2 parts by weight of polystyrene beads as the second particles (a product of Soken Co., having average diameter 3.5 micrometers and refractive index 1.57) were added. To the obtained mixture, 50 parts by weight of isopropyl alcohol was added and mixed well to prepare a hard coat material. Then, a film of triacetate (a product of Fuji Co, T-80UZ) was coated with the above hard coat material in a wet film thickness of 20 micrometers, and the obtained product was dried at 70° C. for 3 minute. The dried layer was irradiated with ultraviolet light using an ultraviolet light irradiation apparatus to prepare a hard coat film by curing.

Embodiment 3

Each with 20 parts by weight of two ultraviolet-curing resins CN983B88 of Sartomer Co. and KRM7039 of Daicel Co. that have a same refractive index of 1.45; 2 parts by weight of photo-cationic polymerization initiator (a product of Ciba Co., Irgacure 184); 10 parts by weight of nano-grade silica particles as the first particles (a product of Clariant Co., OG502-32, having refractive index 1.45 and average particle diameter 25 nanometers); and 4 parts by weight of polystyrene beads as the second particles (a product of Soken Co., having average diameter 3.5 micrometers and refractive index 1.57) were added. To the obtained mixture, 50 parts by weight of isopropyl alcohol was added and mixed well to prepare a hard coat material. Then, a film of triacetate (a product of Fuji Co, T-80UZ) was coated with the above hard coat material in a wet film thickness of 20 micrometers, and the obtained product was dried at 70° C. for 3 minute. The dried layer was irradiated with ultraviolet light using an ultraviolet light irradiation apparatus to prepare a hard coat film by curing.

Comparative Sample 1 (A Conventional Antiglare Film for Low Resolution Display)

Each with 20 parts by weight of two ultraviolet-curing resins CN983B88 of Sartomer Co. and KRM7039 of Daicel Co. that have a same refractive index of 1.45; 2 parts by weight of photo-cationic polymerization initiator (a product of Ciba Co., Irgacure 184); 4 parts by weight of silica particles (a product of Tokuyama Co., having average particle diameter 1.5 micrometers and refractive index 1.45) were added. To the obtained mixture, 50 parts by weight of toluene was added and mixed well to prepare a hard coat material. Then, a film of triacetate (a product of Fuji Co, T-80UZ) was coated with the above hard coat material in a wet film thickness of 20 micrometers, and the obtained product was dried at 70° C. for 3 minute. The dried layer was irradiated with ultraviolet light using an ultraviolet light irradiation apparatus to prepare a hard coat film by curing.

Comparative Sample 2 (An Improved Conventional Antiglare Film)

Each with 20 parts by weight of two ultraviolet-curing resins CN983B88 of Sartomer Co. and KRM7039 of Daicel Co. that have a same refractive index of 1.45; 4 parts by weight of photo-cationic polymerization initiator (a product of Ciba Co., Irgacure 184); 4 parts by weight of acrylic cinnamene particles (a product of Soken Co., having average particle diameter 3.5 micrometers and refractive index 1.57) were added. To the obtained mixture, 50 parts by weight of toluene was added and mixed well to prepare a hard coat material. Then, a film of triacetate (a product of Fuji Co, T-80UZ) was coated with the above hard coat material in a wet film thickness of 20 micrometers, and the obtained product was dried at 70° C. for 3 minute. The dried layer was irradiated with ultraviolet light using an ultraviolet light irradiation apparatus to prepare a hard coat film by curing.

According to evaluation of the above embodiments and comparative samples, the following conclusions are obtained:

1) In respective comparison of haze, gloss, clarity and reflection, it is clear that the clarity and reflection properties of the three embodiments are better than that of the comparative samples 1 under a certain antiglare property.
2) Though the comparative sample 2 has a better clarity, it has a higher reflectivity. The clarity properties are also lower than the three embodiments.
3) From comparisons among the three embodiments, it is noticeable that increasing the proportion of the first (nano-grade) particles to the second (high refractive) particles improves the gloss, clarity and reflection properties. Changing the diameter of the first particles also improves the antiglare property and improves the clarity.

Figure 4:
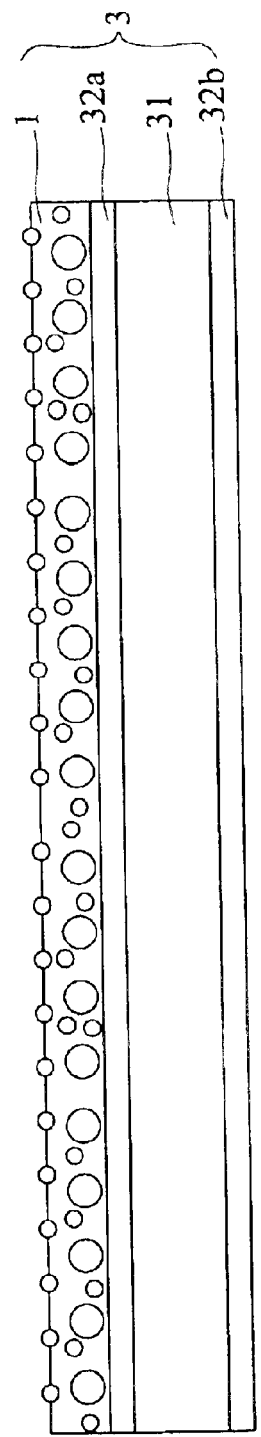
FIG. 4 is a descriptive view of an antiglare film of the invention applied to a polarizer.

As shown in FIG. 1 and FIG. 4, an antiglare film 1 of the invention is applicable to a polarizer. The polarizer 3 includes a polarizing element 31, a first substrate film 32a, a second substrate film 32b and an antiglare film 1.

The polarizing element 31 is made of polyvinyl alcohol (PVA). The first and second substrate films 32a, 32b are made of triacetate (TAC) and adhered to both sides of the polarizing element 31. The antiglare film 1 is adhered to the other side of the first substrate film 32a.

The antiglare film 1 includes a light-transparent resin 11, first light-transparent particles 12 and second light-transparent particles 13. As the antiglare film 1 being adhered to first substrate film 32a, the interior light passing through the substrate film 32a and the exterior light irradiating on the substrate film 32a are diffused to avoid glare to user's eyes, to increase visibility of the displayed image and to decrease the reflectivity of the screen.

The light-transparent resin 11 is at least composed of a curable resin, such as ultraviolet-curing resin, having high transparency. The resin 11 is well mixed with the first light-transparent particles 12 and the second light-transparent particles 13, and then painted on surface of the substrate 2, which is the screen of a display, for example. The resin mixture is then cured and fixed on the substrate 2 where the first and second light-transparent particles 12, 13 are evenly dispersed and fixed in position through a homogenization process to achieve a less surface roughness of the antiglare film 1.

The first light-transparent particles 12 are dispersed on surface and in the interior of the resin 11. The refractive index of the first light-transparent particles 12 is the same as that of the resin 11. The diameters of the first light-transparent particles 12 are of nano-grade, such as 9 to 500 nanometers, so as to be easily dispersed and make a uniform coating surface.

The second light-transparent particles 13 are dispersed in the interior of the resin 11. The refractive index of the second light-transparent particles is different from that of the resin 11. The diameters of the second light-transparent particles 13 are larger than that of the first light-transparent particles 12, such as 1 to 10 micrometers, and preferably 1 to 5 micrometers, and the refractive index is 1.50 to 1.65, so as to be dispersed inside the resin 11 by their own weight and push the first light-transparent particles 12 up the surface of the resin 11 or adjacent to the first light-transparent particles 12.

As shown in FIG. 2, when exterior light irradiates on the antiglare film 1, the roughness of the first light-transparent particles 12 dispersed on surface of the resin 11 diffuses the exterior light. Because the first light-transparent particles 12 are of nano-grade, the roughness of the resin surface is less so that the display image provided by interior light is diffused with smaller angles and remained clear. As shown in FIG. 3, when interior light passing through the substrate film 32a to the antiglare film 1, since the second light-transparent particles 13 having a refractive index different from that of the resin 11 are dispersed inside the resin 11, the interior light is diffused. As for the first light-transparent particles 12 dispersed in the resin 11, since they have a same refractive index as the resin, they do not diffuse the light.

Figure 5:
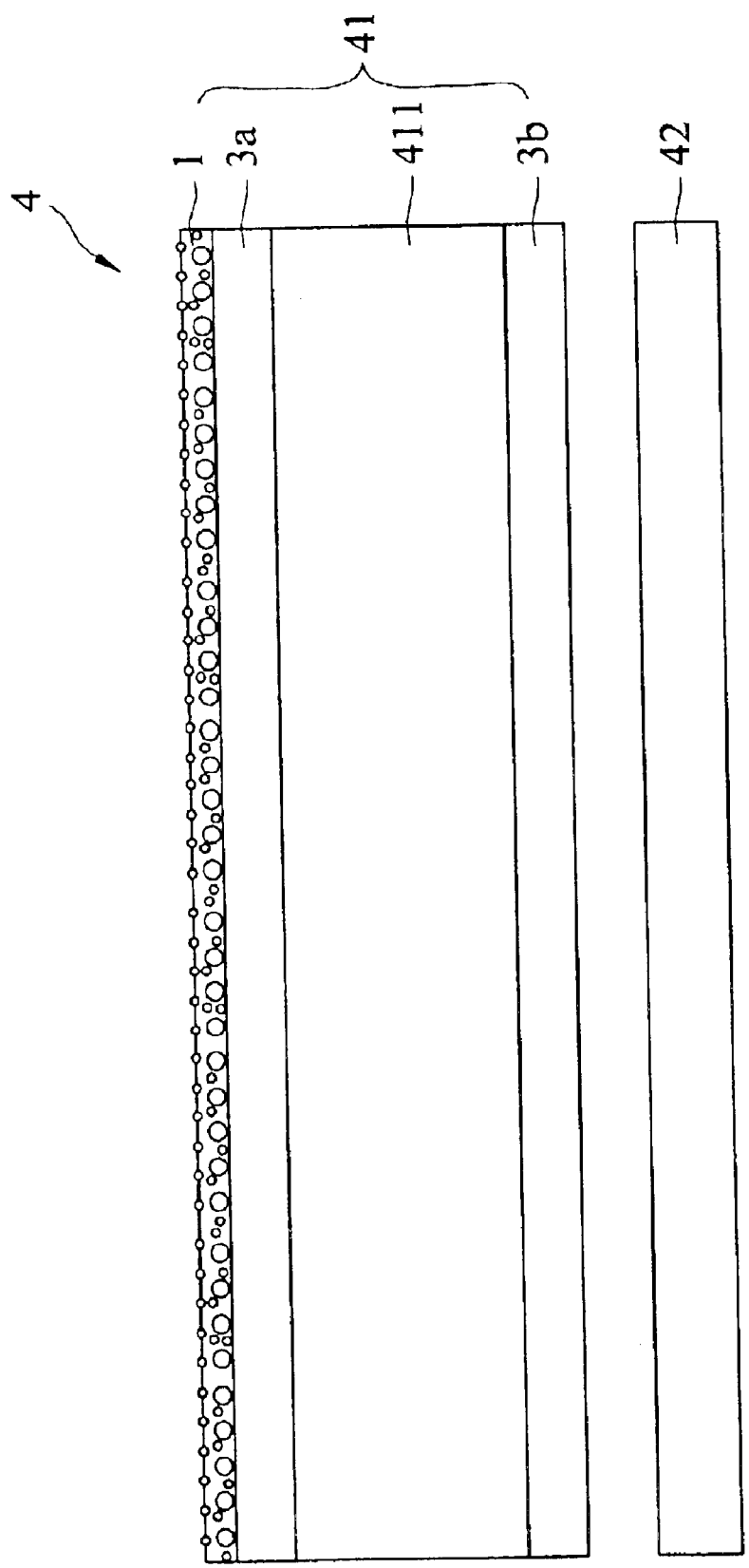
FIG. 5 is a descriptive view of an antiglare film of the invention applied to a display.

As shown in FIG. 1 and FIG. 5, an antiglare film of the invention is applicable to a display 4. The display 4 includes a LCD panel 41 and a backlight module 42.

The LCD panel 41 is composed of a LCD layer 411 held by two polarizers 3a, 3b.

The polarizers 3a, 3b are made of polyvinyl alcohol. The polarizer 3a is coated with an antiglare film 1. The antiglare film 1 includes a light-transparent resin 11, first light-transparent particles 12 and second light-transparent particles 13. As the antiglare film 1 being adhered to the surface of the polarizer 3a (the surface including a substrate film, made of triacetate, is not shown in the drawing), the interior light passing through the polarizer 3a and the exterior light irradiating on the polarizer 3a are diffused to avoid glare to user's eyes, to increase visibility of the displayed image and to decrease the reflectivity of the display 4 by optical interference effects of the two light-transparent particles 12, 13.

The light-transparent resin 11 is at least composed of a curable resin, such as ultraviolet-curing resin, having high transparency. The resin 11 is well mixed with the first light-transparent particles 12 and the second light-transparent particles 13, and then painted on surface of a substrate film of the polarizer 3a. The resin mixture is then cured and fixed on the substrate film where the first and second light-transparent particles 12, 13 are evenly dispersed and fixed in position through a homogenization process to achieve a less surface roughness of the antiglare film 1.

The first light-transparent particles 12 are dispersed on surface and in the interior of the resin 11. The refractive index of the first light-transparent particles 12 is the same as that of the resin 11. The diameters of the first light-transparent particles 12 are of nano-grade, such as 9 to 500 nanometers, so as to be easily dispersed and make a uniform coating surface.

The second light-transparent particles 13 are dispersed in the interior of the resin 11. The refractive index of the second light-transparent particles is different from that of the resin 1. The diameters of the second light-transparent particles 13 are larger than that of the first light-transparent particles 12, such as 1 to 10 micrometers, and preferably 1 to 5 micrometers, and the refractive index is 1.50 to 1.65, so as to be dispersed inside the resin 11 by their own weight and push the first light-transparent particles 12 up the surface of the resin 11.

As for the backlight module 42, it is mounted on another side of the LCD panel 41 and apart from the polarizer 3a.

Similar to FIG. 2 and FIG. 3, the interior and exterior light are diffused by the aforesaid antiglare film 1 so that the visibility of the display is improved, the reflectivity of the display is decreased, and the image contrast is enhanced.

In conclusion, an antiglare film of the invention has the following advantages:
a) When exterior light irradiates on the antiglare film, the light is diffused by first light-transparent particles located on surface of the antiglare film. Since the first particles are of nano-grade, the roughness of the surface is less, and the clarity and contrast of the image is improved;
b) When interior light passes through the antiglare film, the light is diffused by the second light-transparent particles located inside the antiglare film so as to reduce glare;
c) By diffusion of the interior light and the exterior light, the antiglare film reduces glare, improves visibility and reduces reflectivity; and
d) The process for making the antiglare film requires just one step of coating. While, the conventional process for making a low reflectivity antiglare film requires several times of coating.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An antiglare film applied to a surface of a substrate for reducing glare, comprising: a light-transparent resin, through which a light can pass; a plurality of first light-transparent particles, dispersed on surface and in interior of said light-transparent resin, having a same refractive index as that of said resin and comprising silica particles of 9 to 500 nanometer diameters, said first light-transparent particles on surface of said resin evenly dispersed to form a fine roughness surface for obtaining smaller diffusion angles and higher clarity, while said first light-transparent particles in interior of said resin do not diffuse said passing light due to said same refractive index as said resin; and a plurality of second light-transparent particles dispersed inside said light-transparent resin, having diameters of 1 to 10 micrometers, and a different refractive index from said resin, for diffusing said passing light; said light transparent resin, first and second light transparent-particles are coated on said substrate through a one-time coating for obtaining a lower reflectivity by effects of optical interference of said first and second light-transparent particles.

2. An antiglare film according to claim 1 wherein said second light-transparent particles have diameters of 1 to 5 micrometers, and refractive index of 1.50 to 1.65.

3. An antiglare film according to claim 1 wherein said light-transparent resin is composed of curable resin.

4. An antiglare film according to claim 1 wherein said light-transparent resin is composed of ultraviolet-curing resin.

5. A polarizer furnished with an antiglare film for reducing glare, comprising: a polarizer element; a first light-transparent substrate film, having one surface adhered to one side of said polarizer element; and an antiglare film, comprising a light-transparent resin painted on another surface of said first light-transparent substrate film, through which light can pass, a plurality of first light-transparent particles, dispersed on a surface and in interior of said light-transparent resin, having a same refractive index as that of said resin and comprising silica particles of 9 to 500 nanometer diameters, said first light-transparent particles on surface of said resin evenly dispersed to form a fine roughness surface for obtaining smaller diffusion angles and higher clarity, while said first light-transparent particles in interior of said resin do not diffuse said passing light due to said same refractive index as said resin; a plurality of second light-transparent particles dispersed inside said light-transparent resin, having diameters of 1 to 10 micrometers and a different refractive index from said resin, for diffusing said passing light; and a second light-transparent substrate film, having one surface adhered to another side of said polarizer element.

6. A polarizer according to claim 5 wherein material of said first light-transparent substrate film is triacetate.

7. A polarizer according to claim 5 wherein material of said second light-transparent substrate film is triacetate.

8. A polarizer according to claim 5 wherein material of said polarizer element is polyvinyl alcohol.

9. A polarizer according to claim 5 wherein said second light-transparent particles have diameters of 1 to 5 micrometers, and refractive index of 1.50 to 1.65.

10. An polarizer according to claim 5 wherein said light-transparent resin is composed of curable resin.

11. An polarizer according to claim 10 wherein said light-transparent resin is composed of ultraviolet-curing resin.

12. A display furnished with an antiglare film for reducing glare, comprising: a backlight module for providing light; and a LCD panel, mounted on one side of said backlight module, comprising an LCD layer held by two polarizers; one of said polarizers is furnished with an antiglare film, said polarizer with said antiglare film is set apart from said backlight module, said antiglare film comprises: a light-transparent resin through which a light can pass; a plurality of first light-transparent particles, dispersed on a surface and in interior of said light-transparent resin, having a same refractive index as that of said resin and comprising silica particles of 9 to 500 nanometer diameters; said first light-transparent particles on surface of said resin evenly dispersed to form a fine roughness surface for obtaining smaller diffusion angles and higher clarity, while said first light-transparent particles in interior of said resin do not diffuse said passing light due to said same refractive index as said resin; a plurality of second light-transparent particles dispersed inside said light-transparent resin, having diameters of 1 to 10 micrometers, and a different refractive index from said resin, for diffusing said passing light, and said light-transparent resin, first and second light-transparent particles are coated on said substrate through a one-time coating for obtaining a lower reflectivity by effects of optical interference of said first and second light-transparent particles.

13. A display according to claim 12 wherein said second light-transparent particles have diameters of 1 to 10 micrometers and refractive index of 1.50 to 1.65.

14. A display according to claim 12 wherein said light-transparent resin is composed of curable resin.

15. A display according to claim 12 wherein said light-transparent resin is composed of ultraviolet-curing resin.

* * * * *